(12) United States Patent
Shiohara

(10) Patent No.: US 12,061,828 B2
(45) Date of Patent: Aug. 13, 2024

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Tetsuya Shiohara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/849,088

(22) Filed: Jun. 24, 2022

(65) Prior Publication Data

US 2022/0317958 A1 Oct. 6, 2022

Related U.S. Application Data

(63) Continuation of application No. PCT/JP2020/047014, filed on Dec. 16, 2020.

(30) Foreign Application Priority Data

Dec. 27, 2019 (JP) .................................. 2019-239036

(51) Int. Cl.
*G06F 3/12* (2006.01)

(52) U.S. Cl.
CPC .......... *G06F 3/1256* (2013.01); *G06F 3/1204* (2013.01); *G06F 3/1205* (2013.01); *G06F 3/1258* (2013.01)

(58) Field of Classification Search
None
See application file for complete search history.

(56) References Cited

U.S. PATENT DOCUMENTS

| | | | | |
|---|---|---|---|---|
| 9,223,529 B1* | 12/2015 | Khafizova | ............. | G06F 9/4818 |
| 2006/0209330 A1* | 9/2006 | Mitsui | .................. | G06F 3/1205 |
| | | | | 358/1.15 |
| 2014/0268227 A1* | 9/2014 | Nakata | ............... | H04N 1/00233 |
| | | | | 358/1.15 |
| 2019/0354324 A1* | 11/2019 | Kakitsuba | ............. | G06F 3/1204 |
| 2020/0192618 A1* | 6/2020 | Uchida | .................. | G06F 3/1256 |
| 2020/0278819 A1* | 9/2020 | Yamasaki | ............. | G06F 3/1285 |
| 2021/0279021 A1* | 9/2021 | Morimura | ............. | G06F 3/1211 |
| 2022/0317958 A1* | 10/2022 | Shiohara | ............... | G06F 3/1262 |

FOREIGN PATENT DOCUMENTS

| | | |
|---|---|---|
| JP | H11243463 A | 9/1999 |
| JP | 2001159961 A | 6/2001 |
| JP | 2009188505 A | 8/2009 |
| JP | 2010218338 A | 9/2010 |

\* cited by examiner

*Primary Examiner* — Helen Zong
(74) *Attorney, Agent, or Firm* — Canon U.S.A., Inc. IP Division

(57) ABSTRACT

An information processing apparatus includes a saving process unit configured to save, in a storage area, a first print job generated with a first printing apparatus specified and a second print job generated with a second printing apparatus different from the first printing apparatus specified, and a display control unit configured to display, in a case where a third print job including identification information corresponding to the first printing apparatus is received in a state where the first and second print jobs are saved in the storage area, a screen that includes a job name of the received third print job and a job name of the first print job and does not include a job name of the second print job.

14 Claims, 15 Drawing Sheets

FIG.3

| BASIC SETTINGS | |
|---|---|
| TYPE OF SHEET | PLAIN PAPER |
| SHEET SIZE | A4 |
| SHEET FEEDING METHOD | AUTOMATIC SELECTION |
| RESOLUTION | 600 × 600 |

| BASIC SETTINGS | |
|---|---|
| DIRECTION OF PRINTING | ● VERTICAL  ○ HORIZONTAL |
| BORDERLESS ENTIRE SURFACE | OFF |
| PRINT IN UNITS OF COPIES | ON |
| TWO-SIDED PRINTING | OFF |
| LAYOUT PRINTING | OFF |
| PRINT PREVIEW | OFF |
| SAVING OF JOB | OFF |

Print Preview

| Document Name | Number of Pages |
|---|---|
| Document1 | 3 |
| Document2 | 1 |

401

Doc1
Abcdefghijklmn
0123456789

- Page3 -

< 3 > ~402

403

Two-sided Printing  Off  ~404
Layout Printing  Off  ~405
Connect Jobs  Off  ~406

Print ~407
Cancel ~408

FIG.5A

```
<ns0000:QueueID psf:psftype="Feature">
   <ns0000:8yte6p24 psf:psftype="Option" psf:default="true"/>
</ns0000:QueueID >
```

FIG.5B

```
<psf:Feature name="ns0000:QueueID">
   <psf:Option name="ns0000:8yte6p24"/>
</psf:Feature>
```

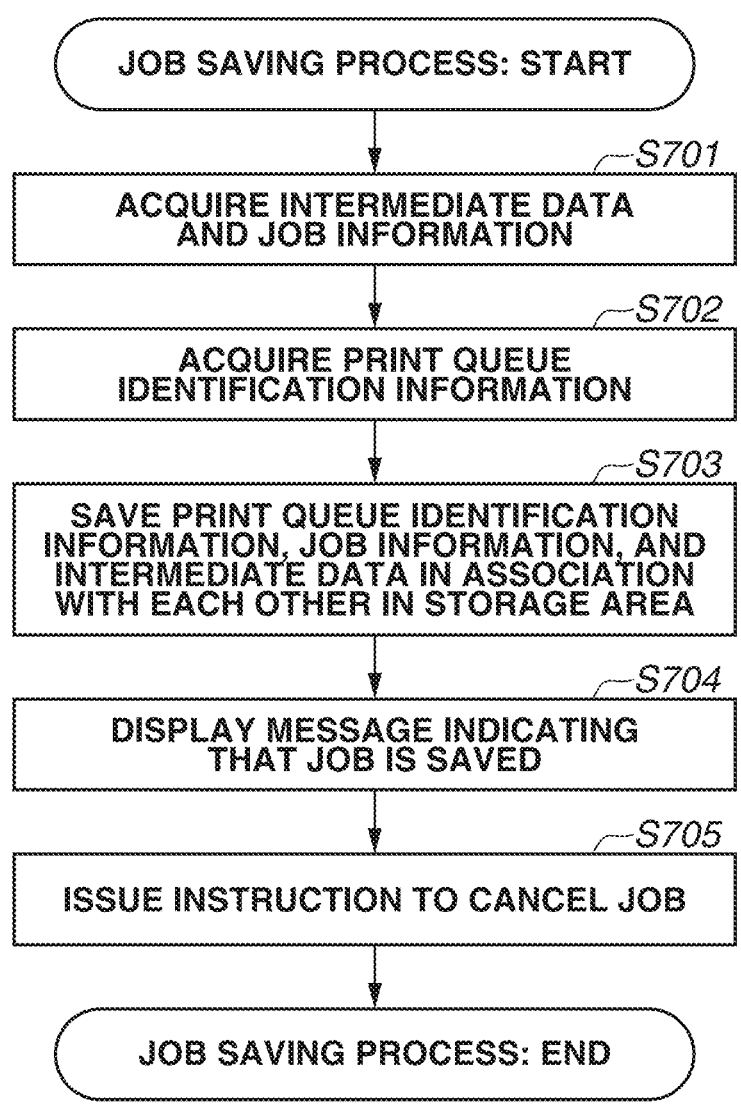

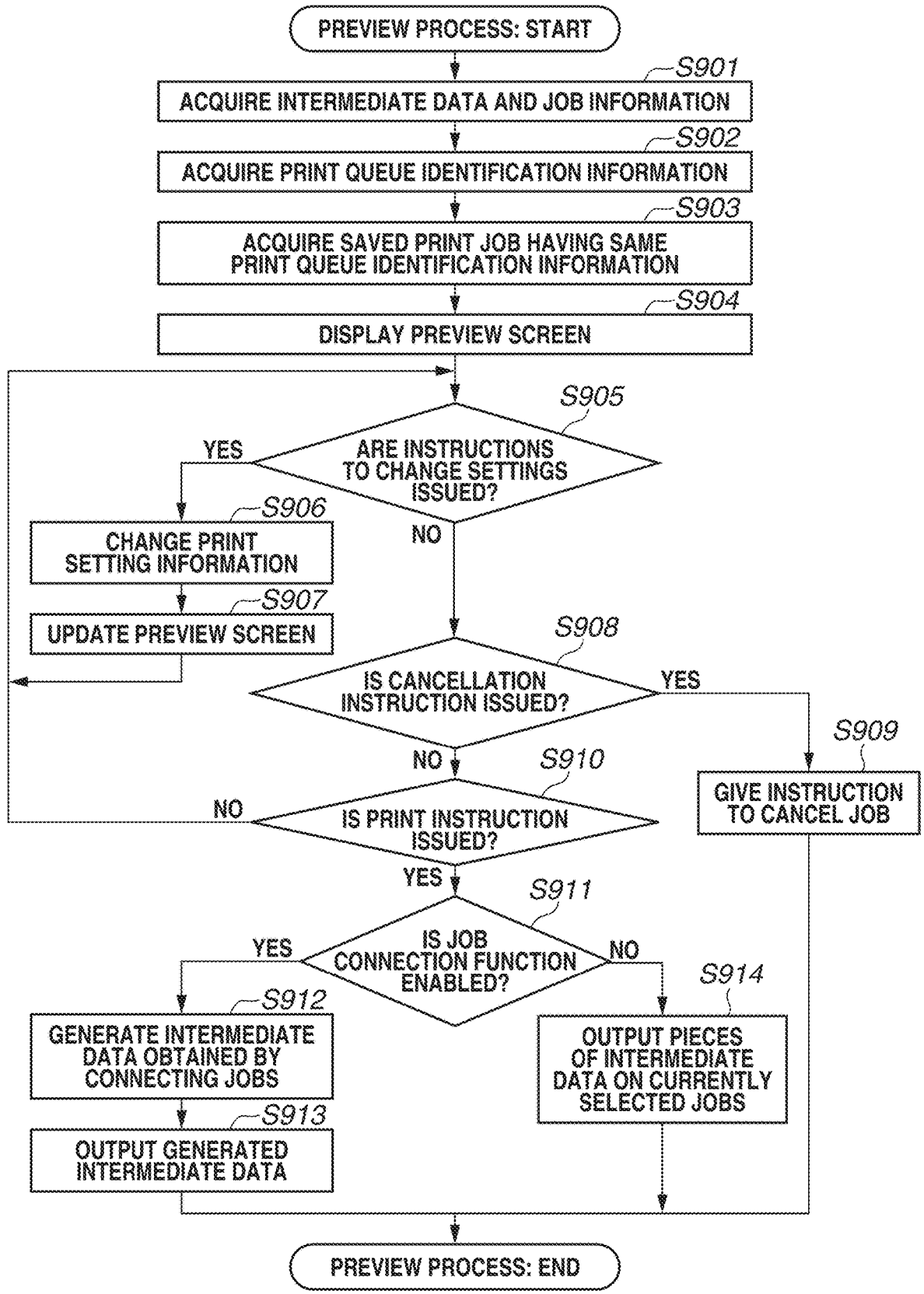

INFORMATION PROCESSING APPARATUS, CONTROL METHOD, AND STORAGE MEDIUM

CROSS-REFERENCE TO RELATED APPLICATIONS

This application is a Continuation of International Patent Application No. PCT/JP2020/047014, filed Dec. 16, 2020, which claims the benefit of Japanese Patent Application No. 2019-239036, filed Dec. 27, 2019, both of which are hereby incorporated by reference herein in their entirety.

BACKGROUND OF THE INVENTION

Field of the Invention

The present invention relates to an information processing apparatus, a control method, and a storage medium.

Background Art

Patent literature 1 (PLT1) discusses a job connection function for connecting a plurality of print jobs together and handling the plurality of print jobs as a single print job.

CITATION LIST

Patent Literature

PTL 1: Japanese Patent Application Laid-Open No. 11-243463

However, even in a printing system different from a printing system discussed in PLT 1, utilizing a job connection function has also been required.

SUMMARY OF THE INVENTION

According to the present invention, it is possible to provide a job connection function in a printing system using an extension application.

According to an aspect of the present invention, an information processing apparatus includes a saving process unit configured to save, in a storage area, a first print job generated with a first printing apparatus specified and a second print job generated with a second printing apparatus different from the first printing apparatus specified, and a display control unit configured to display, in a case where a third print job including identification information corresponding to the first printing apparatus is received in a state where the first and second print jobs are saved in the storage area, a screen that includes a job name of the received third print job and a job name of the first print job and does not include a job name of the second print job.

Further features of the present invention will become apparent from the following description of exemplary embodiments with reference to the attached drawings.

BRIEF DESCRIPTION OF THE DRAWINGS

FIG. 3 is a schematic diagram illustrating a screen on which print settings are performed according to a first exemplary embodiment.

FIG. 4 is a schematic diagram illustrating a user interface of a print preview function.

FIG. 5A is a diagram illustrating an example of print queue identification information.

FIG. 5B is a diagram illustrating an example of print queue identification information.

FIG. 7 is a flowchart illustrating a job saving process according to the first exemplary embodiment.

FIG. 9 is a flowchart illustrating a preview process according to the first exemplary embodiment.

DESCRIPTION OF THE EMBODIMENTS

Figure 1:
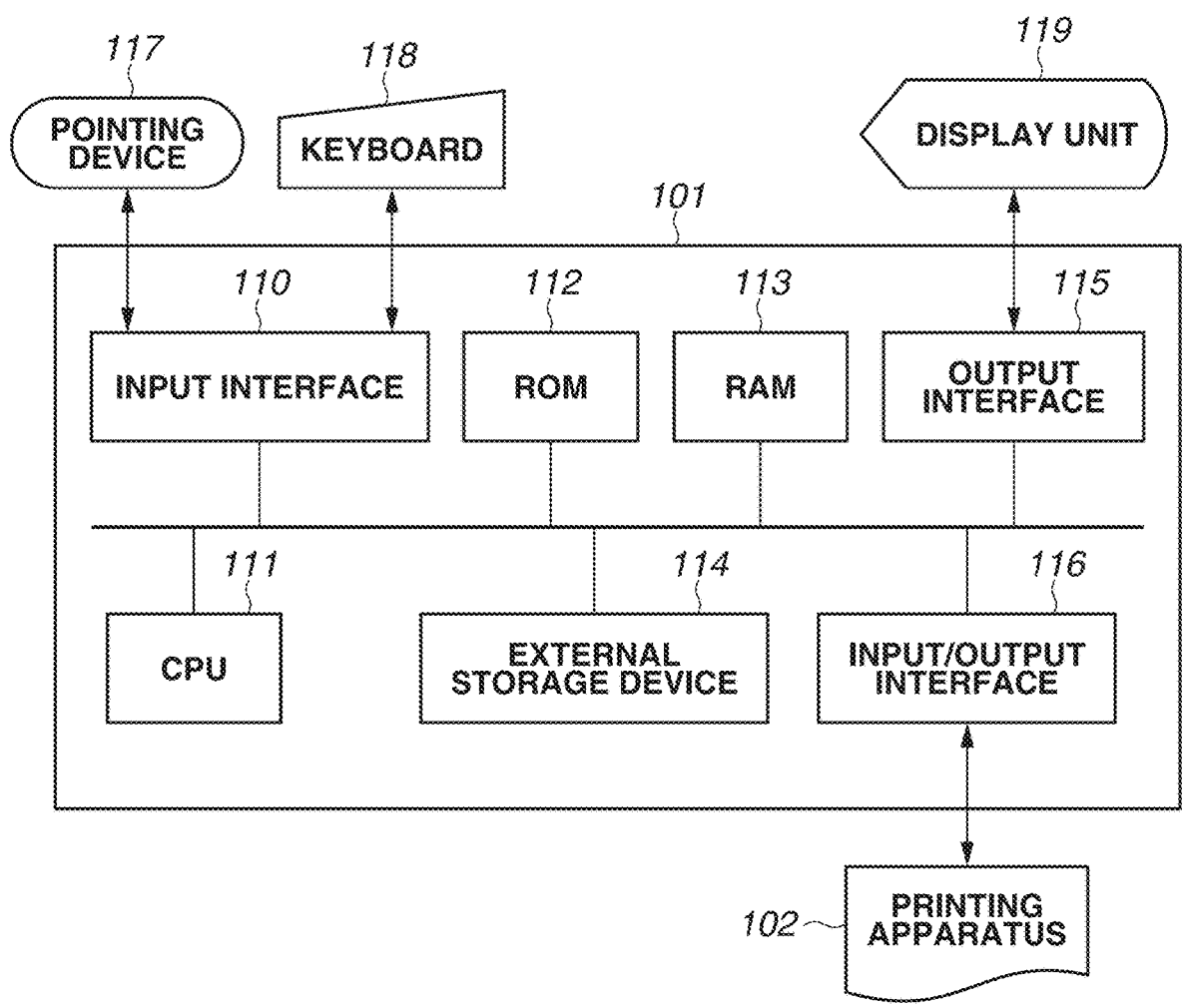
FIG. 1 is a block diagram illustrating a hardware configuration of a printing system.

FIG. 1 is a block diagram illustrating the hardware configuration of a printing system. In FIG. 1, a host computer 101 is an example of an information processing apparatus and includes an input interface 110, a central processing unit (CPU) 111, a read-only memory (ROM) 112, a random-access memory (RAM) 113, an external storage device 114, an output interface 115, and an input/output interface 116. Input devices such as a keyboard 118 and a pointing device 117 are connected to the input interface 110, and a display device, such as a display unit 119, is connected to the output interface 115.

The ROM 112 stores an initialization program. The external storage device 114 stores a group of application programs, an operating system (OS), a print data generation application, and various other types of data. The RAM 113 is used as a work memory for executing various programs stored in the external storage device 114. Windows (registered trademark) can provide an extension application for extending a printer driver function. This application is termed a "Windows Store Device App (WSDA)". A vendor who provides a printing apparatus provides the WSDA, and thus customization of a print setting screen for printing via a particular application can become available. Similarly, there is a print workflow application (app) as an extension application for extending a printer driver function. A vendor who provides a printing apparatus can provide the print workflow app as an extension function of the WSDA. The print workflow app uses a print instruction to a printer driver as a trigger for starting operation and can provide a function involving a graphical user interface (GUI) and a function involving editing of print data.

In the present exemplary embodiment, the functions of the host computer 101 described below and processing regarding flowcharts described below are executed by the CPU 111 performing processing according to the procedure of a program stored in the ROM 112. A printing apparatus 102, which is a device, is connected to the host computer 101 via the input/output interface 116. In the present exemplary embodiment, the host computer 101 and the printing apparatus 102 are separately configured. Alternatively, the host computer 101 and the printing apparatus 102 may be configured as a single information processing apparatus. While the printing apparatus 102 is described using, as an example, an inkjet printer that performs printing by discharging ink onto a paper surface, printing may be executed using another method (e.g., an electrophotographic method). The host computer 101 may be a desktop personal computer, a smartphone, or a laptop personal computer.

Figure 2A:
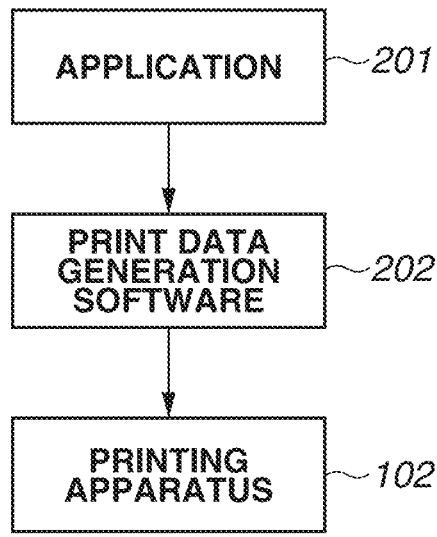
FIG. 2A is a block diagram illustrating a data flow in printing.
Figure 2B:
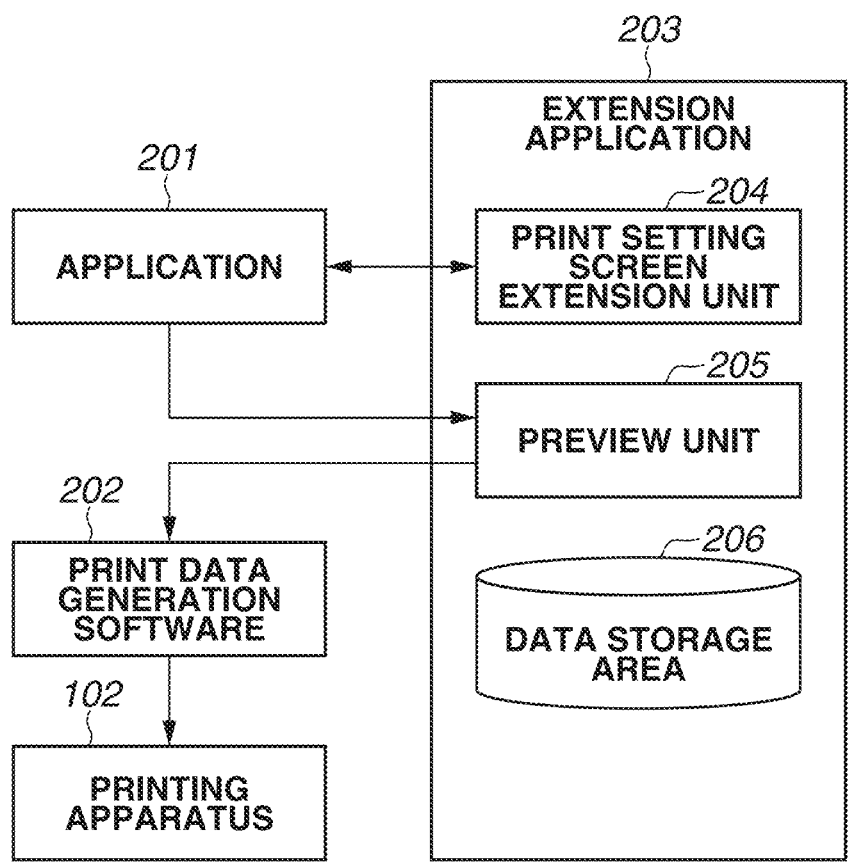
FIG. 2B is a block diagram illustrating the data flow in printing.

FIGS. 2A and 2B are diagrams illustrating data flows in printing. FIG. 2A is a diagram illustrating a data flow in a case where an extension application 203 described below with reference to FIG. 2B is not associated with an application 201, print data generation software 202, and the printing apparatus 102. A user issues an instruction to perform printing via the application 201. The application 201 is software that creates a content to be printed, and for example, corresponds to a document creation application or a spreadsheet application. In a case where the user issues an instruction to perform printing, the user performs a setting process using a print setting screen provided by the OS or the print data generation software 202. By the setting process, the print data generation software 202 generates print setting information. The print setting information includes setting information corresponding to a setting value set using the print setting screen. The print setting information is also referred to as "PrintTicket". Based on application data output from the application 201 in accordance with the print instruction, the OS generates intermediate data (also referred to as "input data"), and passes the intermediate data to the print data generation software 202. The data output for printing from the application 201 is data in a Graphic Device Interface format (GDI format data) or data in an Extensible Markup Language (XML) Paper Specification (XPS) format (XPS format data). Based on the print setting information set by the user, the print data generation software 202 generates print data that can be interpreted by the printing apparatus 102 from the intermediate data, and transmits the print data to the printing apparatus 102. Based on the print data sent from the print data generation software 202, the printing apparatus 102 performs printing on a paper surface.

Figure 15:
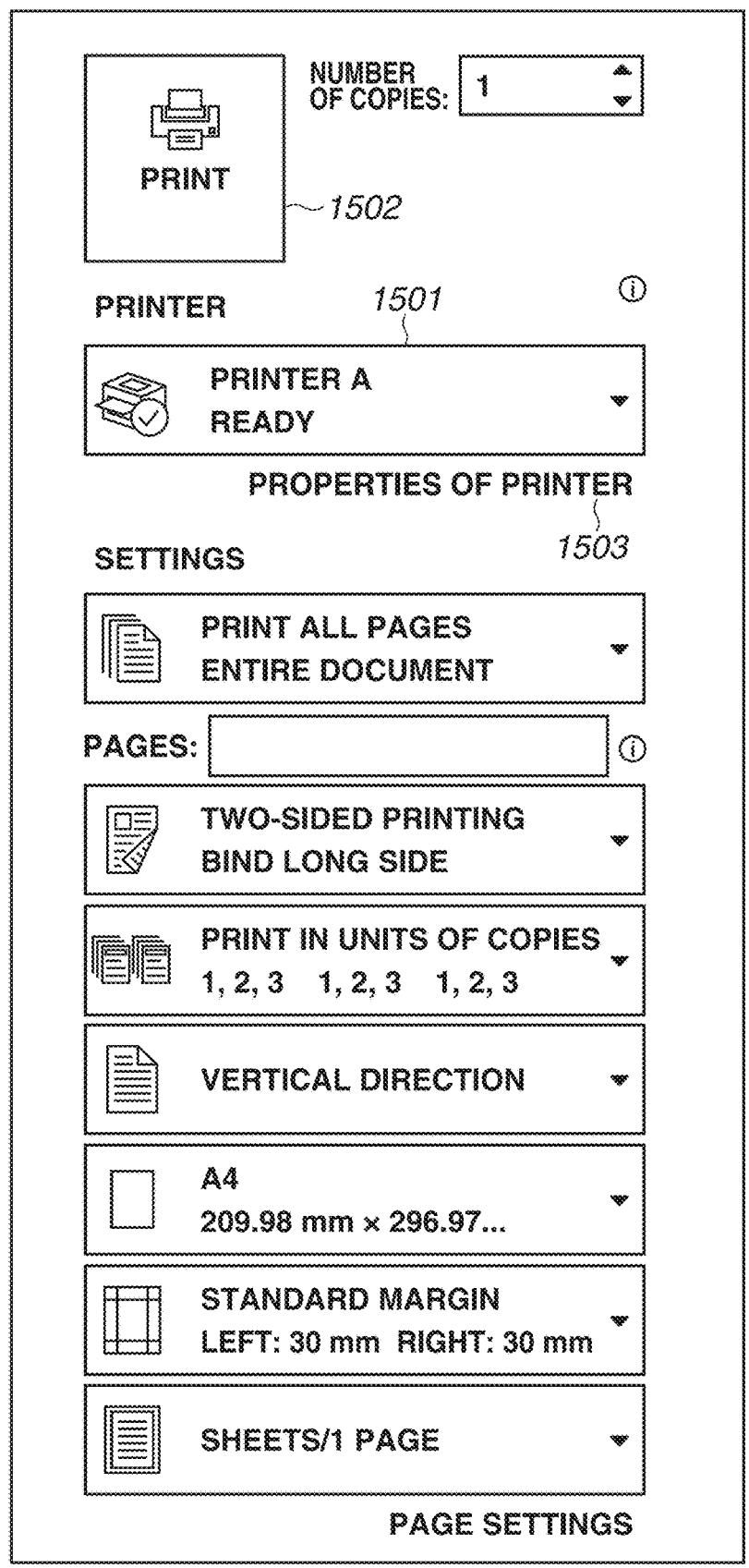
FIG. 15 is a diagram illustrating an example of a screen provided by an application.

The print data generation software 202 is common software that is used in association with a plurality of printing apparatuses. That is, a printing apparatus A can perform printing using print data generated by the print data generation software 202, and also a printing apparatus B can perform printing using print data generated by the print data generation software 202. In a case where the print data generation software 202 is associated with the printing apparatus 102, the print data generation software 202 generates a print queue corresponding to the printing apparatus 102. After the print queue is generated, for example, the user can select a desired print queue from a print queue selection item 1501 on a screen provided by the application 201 as illustrated in FIG. 15. In generating the print queue, the print data generation software 202 acquires capability information regarding the printing apparatus 102 with which the print data generation software 202 is associated. The capability information acquired from the printing apparatus 102 by the print data generation software 202 includes information, such as a sheet size and a type of sheet that are supported by the printing apparatus 102 and availability of borderless printing. The print data generation software 202 saves the capability information acquired from the printing apparatus 102 as capability information data that can be interpreted by the print data generation software 202. The saved capability information data corresponds to a format termed "Generic Printer Description (GPD)" or "Print Device Capabilities (PDC)", but may be in another format. According to the generated capability information data, the print data generation software 202 determines a print setting that can be set by the user. Consequently, while the print data generation software 202 is software used in common by a plurality of printing apparatuses, the print data generation software 202 can operate according to the capabilities of a printing apparatus 102 associated with each print queue. For example, the print data generation software 202 can enable a setting of the borderless printing only for a printing apparatus that supports the borderless printing.

FIG. 2B is a diagram illustrating a data flow in a case where the extension application 203 is associated with the print data generation software 202. The extension application 203 according to the present exemplary embodiment includes the functions of the WSDA and the print workflow app. However, the configuration according to the present exemplary embodiment is not limited to this. The print data generation software 202 is software included in advance in the OS. That is, after completion of installation of the OS on the apparatus, the print data generation software 202 can also be used. On the other hand, the extension application 203 is software that is not included in advance in the OS. Thus, the user operates the host computer 101 to download the extension application 203 from a server via a network and installs the extension application 203. Alternatively, in a case where the printing apparatus 102 is connected to the host computer 101, the CPU 111 acquires device identification information from the printing apparatus 102, and then the CPU 111 may acquire the extension application 203 corresponding to the acquired device identification information from the server via the network and install the extension application 203. That is, the print data generation software 202 and the extension application 203 are held as different files in the host computer 101. While both of the version of the print data generation software 202 and the version of the extension application 203 are updated and upgraded, these update processes may be performed at different timings. More specifically, the timing of when the host computer 101 acquires the print data generation software 202 and the timing of when the host computer 101 acquires the extension application 203 are different from each other. A trigger for the host computer 101 to acquire the print data generation software 202 and a trigger for the host computer 101 to acquire the extension application 203 are also different from each other. In a case where the extension application 203 is installed, the OS associates the print data generation software 202 and the extension application 203 with each other. The extension application 203 according to the present exemplary embodiment includes a print setting screen extension unit 204 and a preview unit 205. The extension application 203 also includes a data storage area 206 for application-specific data. Generally, data is saved in the data storage area 206 distinguishably on a user by user basis for users who have used the extension application 203.

The user issues an instruction to perform printing via the application 201. Specifically, the user presses a print button 1502 on the screen illustrated in FIG. 15, to issue an instruction to perform printing. Also, in the state where the extension application 203 is associated with the print data generation software 202, the user presses a properties-of-printer button 1503 on the screen illustrated in FIG. 15. In this case, the print setting screen extension unit 204 displays a print setting screen described below with reference to FIG. 3. The user performs a setting process using the print setting screen in FIG. 3. By the setting process, the print setting screen extension unit 204 generates print setting information. The details of a print setting function will be described below with reference to FIG. 3.

Based on application data output based on a print instruction issued by pressing performed on the print button 1502 illustrated in FIG. 15 and print setting information set using the print setting screen described below with reference to FIG. 3, the OS generates intermediate data, and outputs the intermediate data to the extension application 203. In response to receipt of the intermediate data, The extension application 203 starts the preview unit 205. The intermediate data includes drawing data corresponding to a content to be printed and the print setting information. Based on GDI data output from the application 201, the OS generates XPS format data as the intermediate data, for example. In a case where the application 201 outputs XPS format data as the application data, the OS may pass the XPS format data as it is to the preview unit 205. In a case where the application 201 outputs XPS format data as the application data, the OS may generate, as the intermediate data, XPS format data obtained by modifying the XPS format data as the application data.

The preview unit 205 acquires the intermediate data generated by the OS and displays a print preview. After checking the print preview that a desired printing result will be obtained, the user issues an instruction to start printing using a user interface (UI) of the print preview. In a case where the preview unit 205 receives the printing start instruction from the user, the preview unit 205 outputs the intermediate data to the print data generation software 202. Based on the intermediate data, the print data generation software 202 generates print data that can be interpreted by the printing apparatus 102, and outputs the print data. The print data output from the print data generation software 202 is sent to the printing apparatus 102. Based on the print data sent from the host computer 101, the printing apparatus 102 performs printing on a paper surface. With the above configuration, the user can use a print preview function that the print data generation software 202 does not have, via the extension application 203.

The description is given on a case where the preview unit 205 operates before the processing of the print data generation software 202. Alternatively, it is also possible that the preview unit 205 operates after the processing of the print data generation software 202. In this case, the preview unit 205 processes print data generated by the print data generation software 202. In a case where the user wishes to process intermediate data in the configuration in which the preview unit 205 operates after the processing of the print data generation software 202, the user may skip the processing of the print data generation software 202. In this case, the extension application 203 operates before the processing of the print data generation software 202 and issues an instruction to skip the processing of the print data generation software 202. Alternatively, the preview unit 205 can operate both before and after the processing of the print data generation software 202.

A method for skipping the processing of the print data generation software 202 is described in detail. The extension application 203 detects that an instruction to perform printing is issued based on the pressing performed on the print button 1502 illustrated in FIG. 15 by the user. Then, based on print setting information output from the application 201, the extension application 203 determines whether to skip the processing of the print data generation software 202. For example, in a case where the print setting information includes setting information that requires editing of pages, such as 2 in 1, the extension application 203 determines that the pages are to be edited using intermediate data. In a case where it is determined that the processing of the print data generation software 202 is to be skipped, the extension application 203 instructs the OS to skip the processing of the print data generation software 202. In response to receipt of the instruction from the extension application 203, the OS generates intermediate data including the skip instruction based on application data and the print setting information output from the application 201. Then, in a case where the print data generation software 202 receives the intermediate data including the skip instruction, the print data generation software 202 sends the received intermediate data to the extension application 203 without generating print data from the intermediate data. By the above processing, the extension application 203 processes intermediate data in the configuration in which the preview unit 205 operates after the processing of the print data generation software 202. In a case where the OS receives the skip instruction from the extension application 203, the OS may send the intermediate data to the extension application 203 without sending the intermediate data to the print data generation software 202. After processing the intermediate data based on the print setting information, the extension application 203 sends the intermediate data to the print data generation software 202. Then, based on the intermediate data, the print data generation software 202 generates print data. After processing the intermediate data based on the print setting information, the extension application 203 itself may generate print data.

FIG. 3 is an example of a print setting screen provided by the print setting screen extension unit 204 of the extension application 203. When issuing a print instruction via the application 201, the user sets print setting information using the print setting screen. In a case where the extension application 203 is not associated with the print data generation software 202, print setting information is set using a standard print setting screen provided by the OS or the print data generation software 202. On the standard print setting screen, print setting information available by functions provided by the print data generation software 202 can be set. That is, in a case where the properties-of-printer button 1503 illustrated in FIG. 15 is pressed in a state where the extension application 203 is not associated with the print data generation software 202, the standard print setting screen with simpler setting items than those illustrated in FIG. 3 is displayed. That is, the print setting screen as illustrated in FIG. 3 is not displayed. In contrast, on the print setting screen provided by the extension application 203, print setting information available by extension functions provided by the extension application 203 can also be set. In the example of FIG. 3, using the print setting screen in FIG. 3, the user can set a print preview function provided by the preview unit 205 and a print job saving function. For example, the print preview function and the print job saving function are setting items that are not included in the standard print setting screen. The print preview function and the print job saving function cannot simultaneously operate. Thus, in a case where the print preview function is enabled, the extension application 203 may perform control to reject operation on the setting for the print job saving function. Conversely, in a case where the print job saving function is enabled, the extension application 203 may perform control to reject operation on the setting of the print preview function.

FIG. 4 is an example of a print preview screen provided by the preview unit 205 of the extension application 203. A display item 401 is a print job list. In the print job list, the job names of print jobs that can be processed on the print preview screen illustrated in FIG. 4 are displayed. The extension application 203 provides a job connection function via the print preview function provided by the preview unit 205. Thus, the print preview screen includes the print job list so that a plurality of print jobs can be set as processing targets on the print preview screen where the print jobs as the processing targets are listed. A display item 402 is used to change a page displayed on the print preview. The user operates the display item 402 to change a page as a display target. In a print preview area 403, the print preview representing an image of a printing result of a specified page is displayed. A display item 404 receives a setting of two-sided printing from the user. A display item 405 receives a setting of layout printing from the user. The layout printing is for placing data pieces as many pages as a specified number of pages on a surface of a single sheet. For example, in a case where the user specifies "2 in 1" using the display item 405, data pieces of two pages is placed on the surface of a single sheet. The user changes print settings using the display items 404 and 405. A display item 406 is used to issue an instruction to determine whether to perform job connection. In a case where the user sets the job connection to on, the preview unit 205 handles print jobs listed in the display item 401 as a single print job. In a case where three or more print jobs are displayed in the display item 401, print jobs selected in the display item 401 by the user become connection targets. A display item 407 is a button for starting printing. In a case where the display item 407 is operated, the preview unit 205 outputs intermediate data on a print job selected in the display item 401 to the print data generation software 202. On the other hand, the preview unit 205 does not output intermediate data on a print job that is not selected in the display item 401 to the print data generation software 202. That is, a print job selected in the display item 401 is processed as a printing target. A display item 408 is a cancel button. In a case where the user presses the cancel button, a subsequent printing process is cancelled. A preview image displayed on the print preview screen illustrated in FIG. 4 corresponds to a content generated by the application 201. Further, a preview image on which the setting contents of the display items 404 to 406 are applied is displayed.

FIG. 4 illustrates an example where a plurality of print jobs is displayed in the display item 401 by executing processing according to the present exemplary embodiment described below. The extension application 203, however, uses a print instruction for a print queue associated with the extension application 203 as a trigger to start operation. Then, after processing a print job corresponding to the print instruction, the extension application 203 ends. That is, since the extension application 203 starts with respect to each print job, handling a plurality of print jobs cannot be performed. As a result, in the printing system in FIG. 2B, there arises an issue that a plurality of print jobs may not be connected together. In response, in a first exemplary embodiment, to connect print jobs together, the extension application 203 saves print jobs of connection targets. Based on a setting change in the setting of "saving of job" in FIG. 3 to on, the extension application 203 saves a print job in the data storage area 206. Alternatively, a setting item "saving of job" may be displayed on the print preview screen illustrated in FIG. 4, and based on a setting change in the setting item "saving of job" to on, the extension application 203 may save a print job in the data storage area 206. Then, the extension application 203 started in response to a print instruction different from that corresponding to the saved print job reads the saved print job, whereby a plurality of print jobs can be handled.

As described above, the print data generation software 202 is associated with a plurality of printing apparatuses 102, and a print queue is generated with respect to each of the printing apparatuses 102 with which the print data generation software 202 is associated. Meanwhile, the extension application 203 can also be associated with a plurality of printing apparatuses 102. That is, the extension application 203 is also used in association with a plurality of print queues. The extension application 203 can access a print job generated with a particular print queue specified and saved in the data storage area 206 even in a case where the extension application 203 is started in response to another print queue. That is, although a plurality of print jobs generated with different print queues specified is less likely to become connection targets, the plurality of print jobs generated with the different print queues specified may be displayed as connection targets in FIG. 4 in a case where the processing according to the present exemplary embodiment described below is not performed. This point is described taking a specific example.

For example, by operating the application 201, the user specifies a printer A using the print queue selection item 1501 illustrated in FIG. 15 and issues an instruction to display the print setting screen illustrated in FIG. 3. Then, in a case where the user enables the saving of a print job using the print setting screen illustrated in FIG. 3 and issues an instruction to perform printing, the extension application 203 saves first intermediate data generated based on application data and print setting information in the data storage area 206. Next, by operating the application 201, the user specifies a printing apparatus B using the print queue selection item 1501 illustrated in FIG. 15 and issues an instruction to display the print setting screen illustrated in FIG. 3. Then, the user enables the print preview function using the print setting screen illustrated in FIG. 3 and issues an instruction to perform printing. In response to the instruction, the extension application 203 displays a preview image based on second intermediate data generated based on application data and print setting information in the print preview area 403 illustrated in FIG. 4. In this process, the extension application 203 can acquire the first intermediate data saved in the data storage area 206 and list the first intermediate data as a connecting target in the display item 401 illustrated in FIG. 4. However, pieces of intermediate data generated with different print queues specified are less likely to be connected together. The reason for this is described taking an example. For example, in the printing apparatuses A and B, sheet sizes that can be used may be different from each other. Consequently, for example, if the first intermediate data is connected to the second intermediate data and print data is transmitted to the printing apparatus B, printing may be performed without appropriately applying the setting contents of the print setting information corresponding to the first intermediate data. Accordingly, in this case, in a case where the user specifies the printing apparatus B in the print queue selection item

1501 illustrated in FIG. 15, it is desirable that the first intermediate data is prevented from being displayed in the display item 401.

Thus, to address the above-described issue in display process, it is necessary to make available only a plurality of print jobs generated with the same print queue specified, on the print preview screen illustrated in FIG. 4. This point is described taking a specific example.

A description will be given using an example case where the first intermediate data generated with the printer A specified by operating the print queue selection item 1501 illustrated in FIG. 15 is saved in the data storage area 206. Further, the second intermediate data generated with the printing apparatus B specified by operating the print queue selection item 1501 illustrated in FIG. 15 is also saved in the data storage area 206. In this situation, by operating the print queue selection item 1501 illustrated in FIG. 15, the user specifies the printing apparatus B and issues an instruction to display the print setting screen illustrated in FIG. 3. Then, the user enables the print preview function using the print setting screen illustrated in FIG. 3 and issues a new instruction to perform printing. According to this new print instruction, the extension application 203 displays a preview image based on third intermediate data generated based on application data and print setting information in the print preview area 403 illustrated in FIG. 4. In this process, the extension application 203 acquires the second intermediate data saved in the data storage area 206 and displays the second intermediate data as a connecting target in the display item 401 illustrated in FIG. 4. Meanwhile, the extension application 203 does not display the first intermediate data in the display item 401 illustrated in FIG. 4.

To achieve the above display process, the extension application 203 saves a print job in association with information identifying a print queue in the data storage area 206. As the information identifying the print queue, the name of the print queue can be used. The name of the print queue, however, can be changed by the user. If the name of the print queue is changed, saved data may become unavailable for use, or reading out a print job saved in association with a different print queue may occur. In response, the extension application 203 adds print queue identification information for uniquely identifying a print queue associated with a print job to the above-described capability information data. Then, the extension application 203 saves the print queue identification information and the print job in association with each other in the data storage area 206. As a result, the extension application 203 can read a print job corresponding to a target print queue.

The print queue identification information is added to the capability information data by the extension application 203 at a timing of when the print data generation software 202 is associated with the printing apparatus 102 and a print queue is generated. The configuration of the present exemplary embodiment, however, is not limited to this. The timing may be any timing of when the extension application 203 can operate, such as a timing of when the extension application 203 is started for the first time using printing as a trigger, or a timing of when the user starts the extension application 203 alone. In the description of the present exemplary embodiment, the capability information data to which the print queue identification information is added by the extension application 203 is GPD or PDC data. The data format, however, is not limited to these.

FIGS. 5A and 5B are diagrams illustrating the print queue identification information that is added by the extension application 203. FIG. 5A is a diagram illustrating print queue identification information that is added to PDC data. In the PDC data, a function and an option settable in the function can be described. In FIG. 5A, the extension application 203 adds a function "QueueID" to the PDC data. The extension application 203 adds unique identification (ID) to be used as the print queue identification information as an option to the added "QueueID". The capability information data to which the print queue identification information is added is not limited to the PDC data. The data format is determined according to capability information data generated by the print data generation software 202.

FIG. 5B is a diagram illustrating information that is added to PrintTicket serving as print setting information by addition of the description illustrated in FIG. 5A. In the function "QueueID" added to the PDC data, a single option "8yte6p24" is set. In the PDC data, a single settable option can be defined by "QueueID". Consequently, this setting will not be changed. Thus, this option is always set in PrintTicket. That is, based on the contents set on the print setting screen illustrated in FIG. 3, the extension application 203 generates print setting information (PrintTicket). The extension application 203 adds the three lines illustrated in FIG. 5B to the generated print setting information based on the description content illustrated in FIG. 5A. Then, the application 201 is notified of print setting information obtained by adding the three lines illustrated in FIG. 5B to the print setting information based on the contents set on the print setting screen illustrated in FIG. 3. In response to pressing performed on the print button 1502 illustrated in FIG. 15, the extension application 203 is notified of intermediate data including application data (drawing data) and the print setting information obtained by adding the three lines illustrated in FIG. 5B. While, in the above description, the extension application 203 adds the three lines illustrated in FIG. 5B to the print setting information based on the description content illustrated in FIG. 5A, the configuration of the present exemplary embodiment is not limited to this. For example, the extension application 203 may generate print setting information based on the contents set on the print setting screen illustrated in FIG. 3, and output the print setting information not including the three lines illustrated in FIG. 5B, to the OS. Then, the OS may add the three lines illustrated in FIG. 5B to the print setting information based on the description content illustrated in FIG. 5A. While, in the above-described example, the print setting screen illustrated in FIG. 3 is displayed, there is also a case where an instruction to perform printing is issued without displaying the print setting screen illustrated in FIG. 3. In this case, the OS may acquire default print setting information corresponding to a print queue selected in the print queue selection item 1501 illustrated in FIG. 15 and add the three lines illustrated in FIG. 5B to the print setting information based on the description content illustrated in FIG. 5A.

By the above processing, intermediate data is generated based on print setting information to which print queue identification information has been added. Thus, in step S702 described below, the extension application 203 can acquire the print queue identification information by acquiring the setting value of "QueueID" from the print setting information. The print queue identification information does not necessarily need to be unique to a print queue. To handle a saved job in common between a plurality of print queues, a method of adding common identification information to the plurality of print queues can also be used. In determination of whether to assign the common identification information, a method for referencing capability information data to set print queues associated with printing apparatuses having common capabilities as targets can be used. For example, there can be a case where a print queue corresponding to a new printing apparatus having the same function as that of a reference printing apparatus for which a print queue has been generated in the past is associated with the extension application 203. In this case, the extension application 203 adds the same print queue identification information as print queue identification information assigned to the reference printing apparatus to capability information data on the new printing apparatus. This method is merely an example, and a different method may be used.

Figure 8A:
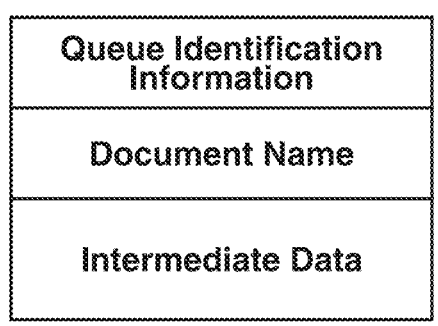
FIG. 8A is a schematic diagram illustrating an example of a job saving method.
Figure 8B:
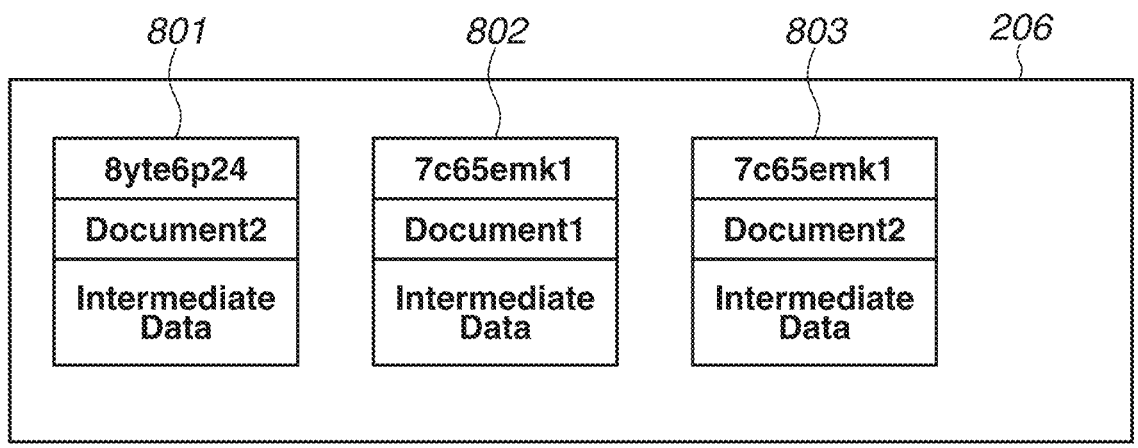
FIG. 8B is a schematic diagram illustrating an example of the job saving method.

FIGS. 8A and 8B are diagrams each illustrating an example of a method in which the extension application 203 saves a print job in the data storage area 206. FIG. 8A is a diagram illustrating an example of information that is saved for a single print job.

The extension application 203 saves print queue identification information for identifying a print queue for which a print instruction is issued, a document name, and intermediate data including a print content in association with each other. In the present exemplary embodiment, data in which the print queue identification information, the document name, and the intermediate data including the print content are associated with each other is also referred to as a "print job".

The document name and the intermediate data are acquired by processing of the preview unit 205 of the extension application 203. The print queue identification information is acquired from print setting information (PrintTicket) by the processing of the preview unit 205 of the extension application 203. Methods for saving the above-described pieces of information in association with each other include a method for generating a single piece of binary data including all the above pieces of information in a predetermined format, a method for associating the above pieces of information with each other by assigning a file name following a naming rule, a method for managing association information in a different file, and the like. The configuration of the present exemplary embodiment, however, is not limited to these. Pieces of information to be saved are not limited to these, either. Alternatively, information regarding an application that has performed printing may be saved together with the above pieces of information.

FIG. 8B is a schematic diagram illustrating a state where print jobs are saved in the data storage area 206. Three saved print jobs 801 to 803 are saved in the data storage area 206 of the extension application 203. In each of the saved print jobs 801 to 803, print queue identification information, a document name, and intermediate data are saved in association with each other. Because the saved print jobs 802 and 803 have the same print queue identification information, it can be understood that the saved print jobs 802 and 803 are print jobs generated according to print instructions for the same print queue. In a case where "saving of job" is enabled on the print setting screen illustrated in FIG. 3, the extension application 203 saves a print job in the data storage area 206 in the form illustrated in FIG. 8B. Also, for example, in a case where the print preview screen illustrated in FIG. 4 includes the setting item for the job saving function, and the job saving function is enabled on the print preview screen illustrated in FIG. 4, and the display item 407 is pressed, the extension application 203 may save a print job in the data storage area 206 in the form illustrated in FIG. 8B.

Figure 6:
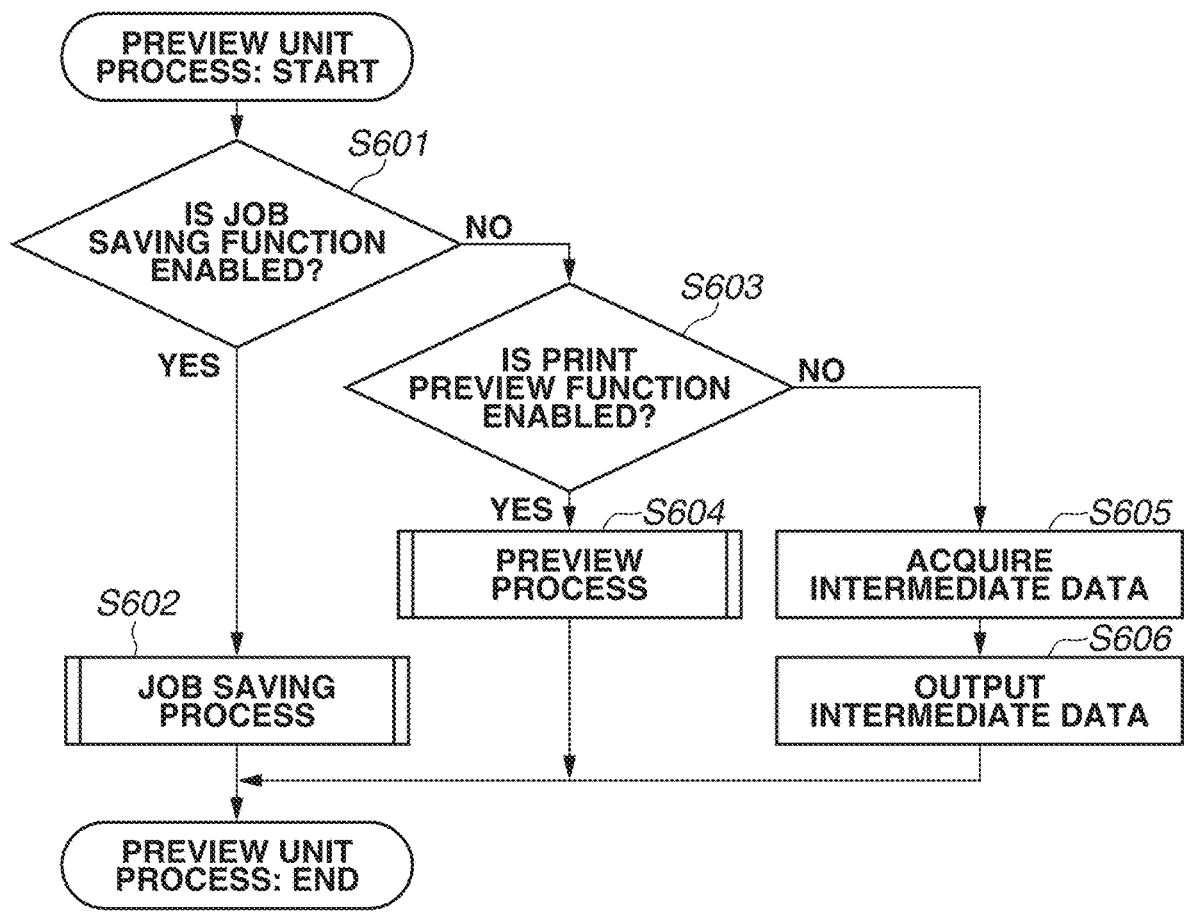
FIG. 6 is a flowchart illustrating a preview unit process according to the first exemplary embodiment.

FIG. 6 is a flowchart regarding a display control process performed by the extension application 203 according to the first exemplary embodiment. In the following description, the extension application 203 may perform each process, but actually, steps in the flowchart are achieved by the CPU 111 executing a program corresponding to the flowchart. In response to pressing performed on the properties-of-printer button 1503 by the user in a state where a print queue associated with the extension application 203 is selected in the print queue selection item 1501 illustrated in FIG. 15, the print setting screen illustrated in FIG. 3 is displayed. In response to an instruction to perform printing issued from the user (pressing performed on the print button 1502) on the screen in FIG. 15 of the application 201 that is displayed after an OK button in the print setting screen illustrated in FIG. 3 is pressed, a print job is generated. In response to receipt of the print job by the extension application 203, the processing illustrated in FIG. 6 is started.

First, in step S601, the extension application 203 references print setting information set by the user and determines whether the print job saving function is on (enabled). As described above, the processing in FIG. 6 is started in response to receipt of a print job. Print setting information included in intermediate data on the received print job is referenced in step S601.

In a case where it is determined that the print job saving function is on (YES in step S601), the processing proceed to step S602. In step S602, the extension application 203 performs a job saving process.

FIG. 7 is a flowchart regarding the job saving process in step S602. First, in step S701, the extension application 203 acquires the intermediate data and job information from the print job. The job information corresponds to a document name that is displayed in the display item 401 on the preview screen. Next, in step S702, the extension application 203 acquires print queue identification information from the print setting information included in the intermediate data. The extension application 203 acquires PrintTicket serving as the print setting information and acquires the print queue identification information from the setting value of "QueueID" illustrated in FIG. 5B. In the example of FIG. 5B, "8yte6p24" is acquired as the print queue identification information.

Next, in step S703, the extension application 203 saves the intermediate data, the job information, and the print queue identification information that are acquired in steps S701 and S702 in association with each other, in the data storage area 206 of the extension application 203. By the process of step S703, the print job is saved in the state as illustrated in FIG. 8B.

Next, in step S704, the extension application 203 notifies the user that the print job is saved. Then, in step S705, the extension application 203 instructs a print system of the OS to cancel the print job and ends the processing on the print job.

In step S601, in a case where it is determined that the print job saving function is not on (NO in step S601), then in step S603, the extension application 203 determines whether the print preview function is on. In a case where the print preview function is on (YES in step S603), the processing proceed to step S604. In step S604, the extension application 203 performs a preview process.

FIG. 9 is a flowchart regarding the preview process in step S604. First, in step S901, the extension application 203 acquires the intermediate data and the job information regarding the print job generated according to the print instruction serving as the trigger for starting the extension application 203. The print instruction serving as the trigger for starting the extension application 203 is issued in response to pressing performed on the print button 1502 by the user on the screen illustrated in FIG. 15 of the application 201 that is displayed after the OK button in FIG. 3 is pressed.

Next, in step S902, the extension application 203 acquires queue identification information from the print setting information included in the intermediate data. In a case where the information illustrated in FIG. 5B is stored in the print setting information, "8yte6p24" is acquired as the print queue identification information. Next, in step S903, the extension application 203 references the data storage area 206 of the extension application 203 and searches for a saved job that matches the print queue identification information acquired in step S902. Then, the extension application 203 acquires job information and intermediate data regarding the saved job found by the searching. That is, the extension application 203 executes an acquisition control process for acquiring a saved job having print queue identification information matching the print queue identification information acquired in step S902 and not acquiring a saved job having print queue identification information not matching the print queue identification information acquired in step S902. In the case of FIG. 8B as an example, it can be determined that the print queue identification information included in the saved print job 801 matches the print queue identification information acquired in step S902, namely "8yte6p24". That is, a print queue specified when the print job acquired in step S901 is generated and a print queue specified when the saved print job 801 is generated are the same as each other. On the other hand, the print queue specified when the print job acquired in step S901 is generated and print queues specified when the saved print jobs 802 and 803 are generated are different from each other.

Next, in step S904, based on the data acquired in steps S901 to S903, the extension application 203 displays the print preview screen. As illustrated in FIG. 4, in the display item 401 displayed on the print preview screen, the job information regarding the print job acquired in step S901 and the job information regarding the saved job acquired in step S903 are listed. The extension application 203 operates based on a user instruction received via the displayed print preview screen. Examples of the user instruction include instructions to change print settings using the display items 404 to 406, a print instruction using the display item 407, and a cancellation instruction using the display item 408.

Figure 10:
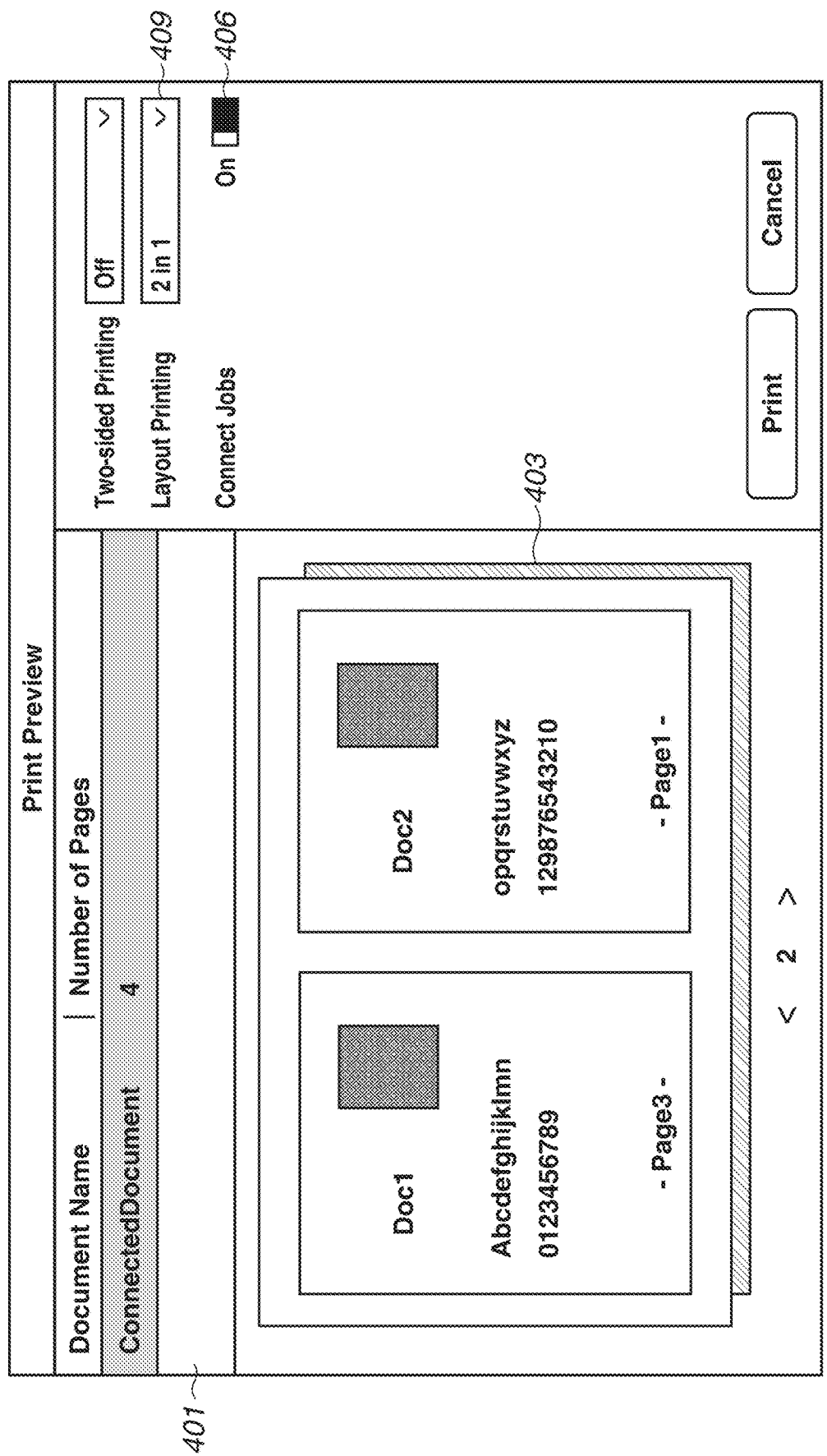
FIG. 10 is a schematic diagram illustrating a print preview screen after print settings are changed.

In a case where it is determined that instructions to change print settings are received from the user (YES in step S905), the processing proceeds to step S906. In step S906, the extension application 203 changes the print setting information based on the instructions to change print settings from the user. Next, in step S907, the extension application 203 updates the preview screen based on the changed print setting information. On the preview screen illustrated in FIG. 4, the user changes the layout setting from "off" to "2 in 1" using the display item 405, selects Documents 1 and 2 displayed in the display item 401, and enables the print job connection function (sets the print job setting to on) using the display item 406. The preview screen updated in response to receipt of the above change instructions is illustrated in FIG. 10.

According to the change in the job connection setting to on (display item 406 in FIG. 10), the extension application 203 connects the print jobs selected in the display item 401 in FIG. 4, to generate a single connected job. Thus, a single connected job is displayed in the display item 401 illustrated in FIG. 10. In FIG. 10, the number of pages of the connected job is a value obtained by adding the numbers of pages of the two print jobs selected as the connection targets. According to the change in the layout setting to 2 in 1 (display item 409 in FIG. 10), the extension application 203 updates the preview image displayed in the print preview area 403 to a preview image on which the setting "2 in 1" is applied. In the print preview area 403 in FIG. 10, a preview image in which the last page of Document 1 before being connected and the first page of Document 2 before being connected are laid out is displayed.

In a case where it is determined that a cancellation instruction is received from the user (YES in step S908), the processing proceeds to step S909. In step S909, the extension application 203 instructs the print system of the OS to cancel the print job. Consequently, the print job acquired in step S901 ends without performing printing, and the preview screen is erased.

In a case where it is determined that a cancellation instruction is not received from the user (NO in step S908) and in a case where it is determined that a print instruction is received from the user (YES in step S910), the processing proceeds to step S911. In step S911, the extension application 203 checks whether the job connection setting is on. In a case where it is determined that the job connection setting is on (YES in step S911), the processing proceeds to step S912. In step S912, the extension application 203 generates a single piece of intermediate data based on the pieces of intermediate data on the plurality of print jobs selected in the display item 401 illustrated in FIG. 4. Next, in step S913, the extension application 203 outputs the generated intermediate data to the print data generation software 202.

In step S911, in a case where it is determined that the job connection setting is off (NO in step S911), the processing proceeds to step S914. In step S914, the extension application 203 transmits the pieces of intermediate data corresponding to the print jobs selected in the display item 401 to the print data generation software 202.

In a case where it is determined in step S603 that the print preview function is not on (NO in step S603), the processing proceeds to step S605. In step S605, the extension application 203 acquires the intermediate data. In step S606, the extension application 203 outputs the intermediate data to the print data generation software 202. As described above, the processing in FIG. 6 is started in response to receipt of a print job. Intermediate data on the received print job is acquired in step S605.

According to the present exemplary embodiment, in a system configuration as illustrated in FIG. 2B, a plurality of print jobs can be collectively printed as a single print job. Further, by the process of step S903, print jobs generated with the same print queue specified are acquired as print jobs to be selected as connection targets, whereby user convenience is improved. This configuration can be similarly achieved also in a case where the preview unit 205 operates after the processing of the print data generation software 202. In this case, print data generated by the print data generation software 202 is used instead of intermediate data. In a case where intermediate data is used in the configuration in which the preview unit 205 operates after the processing of the print data generation software 202, the processing of the print data generation software 202 can be skipped. The method has been described above, and therefore is not described in detail. However, in such configuration, it is also possible that the print data generation software 202 generates final print data. The extension application 203 generates intermediate data obtained by connecting a plurality of pieces of intermediate data selected as connection targets. Then, the extension application 203 outputs the connected intermediate data to the print data generation software 202.

The print data generation software 202 receives the output and generates print data based on the connected intermediate data.

In the first exemplary embodiment, the extension application 203 saves a print job in the data storage area 206. Then, the extension application 203 started using receipt of another print job as a trigger acquires the saved print job saved in the data storage area 206, whereby handling a plurality of print jobs becomes available, and consequently, job connection can be achieved.

In the first exemplary embodiment, however, the following issue arises. For example, the user specifies a print queue corresponding to a printer A, enables the print preview function, and issues an instruction to perform printing. According to the instruction, intermediate data A is generated, and a preview screen based on the intermediate data A is displayed. After the preview screen is displayed, the user wishes to connect the intermediate data A to subsequent intermediate data B. In this case, the user issues an instruction to save a job on the print preview screen illustrated in FIG. 4 and presses the print button of the display item 407, to close the print preview screen. Then, the user ends the processing of the extension application 203. After that, the user specifies the print queue corresponding to the printer A, enables the print preview function, and issues an instruction to perform printing. According to the instruction, the intermediate data B is generated, and also a print preview screen based on the intermediate data B is displayed. In the display item 401 on the print preview screen based on the intermediate data B, job information regarding the intermediate data A is also displayed. More specifically, in a case where the user wishes for a connection process after the print preview screen is displayed, the information processing apparatus performs troublesome control such as ending the processing of the extension application 203 once and starting the processing of the extension application 203 again. A second exemplary embodiment is directed to address this issue.

Figure 14:
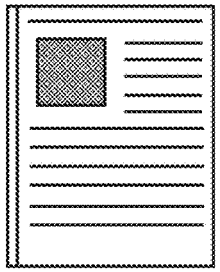
FIG. 14 is a schematic diagram illustrating a screen on which print settings are performed according to the second exemplary embodiment.

FIG. 14 is an example of a print setting screen provided by the print setting screen extension unit 204 of the extension application 203 in the second exemplary embodiment. In the example of FIG. 14, a setting 1401 for performing job connection is provided as a setting accompanying the settings of the print preview function provided by the preview unit 205. The job connection function is performed together with the print preview function, and the setting 1401 for the job connection can be set to on in a case where the print preview function is enabled (print preview setting is on).

Figure 11:
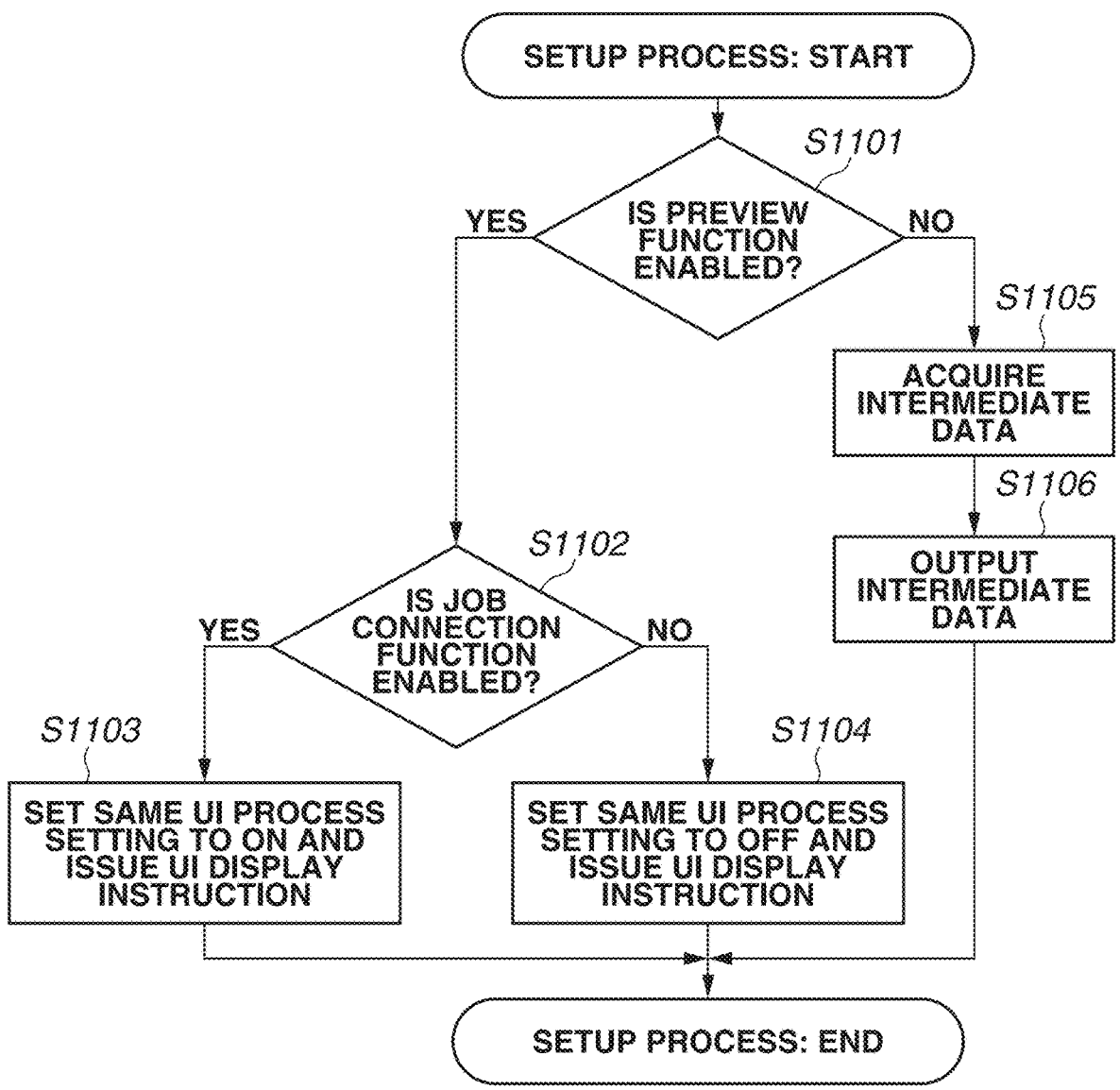
FIG. 11 is a flowchart illustrating a setup process according to a second exemplary embodiment.

FIG. 11 is a flowchart illustrating the processing of the extension application 203 according to the second exemplary embodiment. The processing procedure of the flowchart illustrated FIG. 11 is started in a case where an instruction to perform printing is issued by the user pressing the print button 1502 illustrated in FIG. 15.

First, in step S1101, using print setting information included in intermediate data generated in response to the pressing performed on the print button 1502, the extension application 203 checks whether the preview setting is on. In a case where it is determined that the preview setting is on (YES in step S1101), the processing proceeds to step S1102. In step S1102, the extension application 203 checks whether the job connection setting is on. The processing in step S1102 is also performed using the print setting information. The user sets settings of the print preview function and the job connection function on the print setting screen illustrated in FIG. 14. That is, the print setting information is generated based on the setting contents on the print setting screen illustrated in FIG. 14. Thus, the extension application 203 can execute steps S1101 and S1102 by using the print setting information.

In a case where the job connection function and the print preview function are enabled (which corresponds to YES in step S1102), the processing proceeds to step S1103. In step S1103, the extension application 203 sets to on a same UI process setting which indicates handling print jobs with a single UI. Then, the extension application 203 transmits a UI display request to the OS. The same UI process setting is also referred to as a "display maintenance function".

In a case where the job connection function is not used and the print preview function for a single print job is enabled (NO in step S1102), the processing proceeds to step S1104. In step S1104, the extension application 203 sets to off the same UI process setting indicating handling print jobs with a single UI. Then, the extension application 203 transmits a UI display request to the OS.

In a case where it is determined in step S1101 that the print preview function is disabled (NO in step S1101), the processing proceeds to steps S1105 and S1106. The processes of steps S1105 and S1106 are similar to those of steps S605 and S606, and therefore the redundant descriptions are omitted.

Figure 12:
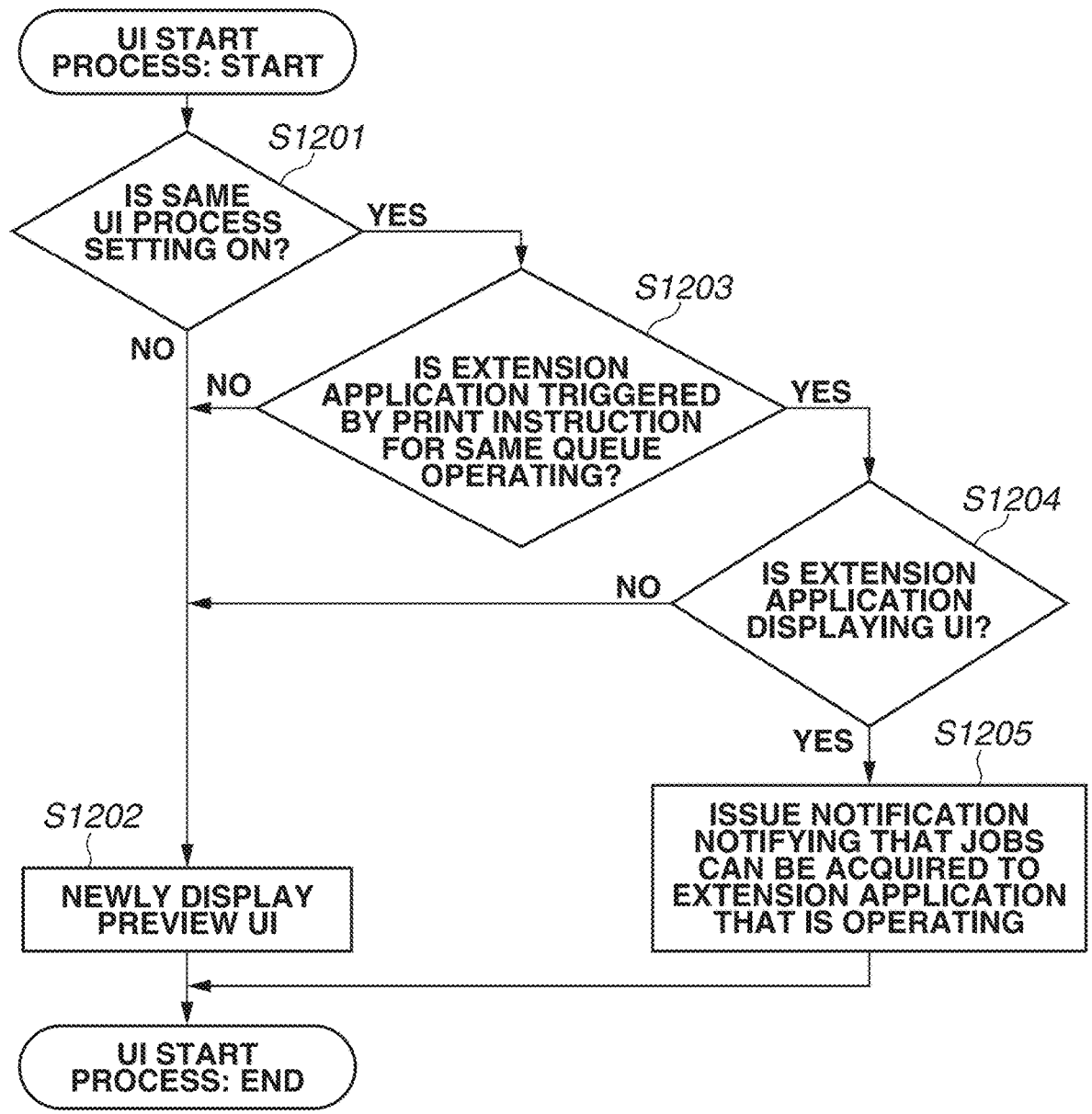
FIG. 12 is a flowchart illustrating a user interface (UI) start process according to the second exemplary embodiment.

In response to receipt of the UI display request transmitted from the extension application 203 in step S1103 or S1104, the OS performs a UI start process. FIG. 12 illustrates a flowchart regarding the UI start process performed by the OS.

First, in step S1201, the OS determines whether the same UI process setting specified together with the UI display request is on. In a case where the same UI process setting is off (NO in step S1201), the processing proceeds to step S1202. In step S1202, the OS newly starts a UI to perform displaying a print preview on print job basis. As a result, the extension application 203 displays the print preview screen illustrated in FIG. 4.

In a case where the same UI process setting is on (YES in step S1201), the processing proceeds to step S1203. In step S1203, the OS checks whether the extension application 203 started using a print instruction for the same print queue as a trigger is operating.

In a case where the extension application 203 started in response to a print instruction for the same print queue is operating (YES in step S1203), the processing proceeds to step S1204. In step S1204, the OS enables the same UI process setting and checks whether the extension application 203 is displaying the UI. Even in a case where the extension application 203 is operating, there is no such extension application that can process the print jobs served as the trigger for the start of the processing in FIG. 12 and is currently operating, when processing for not displaying the UI is performed or when the extension application 203 is not performing processing on a plurality of print jobs as targets. Thus, in a case where it is determined that the extension application 203 is not displaying the UI (NO in step S1204), the processing proceeds to step S1202. In step S1202, the OS newly starts the UI.

In a case where it is determined that the extension application 203 is displaying the UI (YES in step S1204), the processing proceeds to step S1205. In step S1205, the OS issues a notification notifying that jobs can be acquired, to the extension application 203 that is operating, so that the extension application 203 that is operating can process the print jobs served as the trigger for the start of the processing in FIG. 12.

Figure 13:
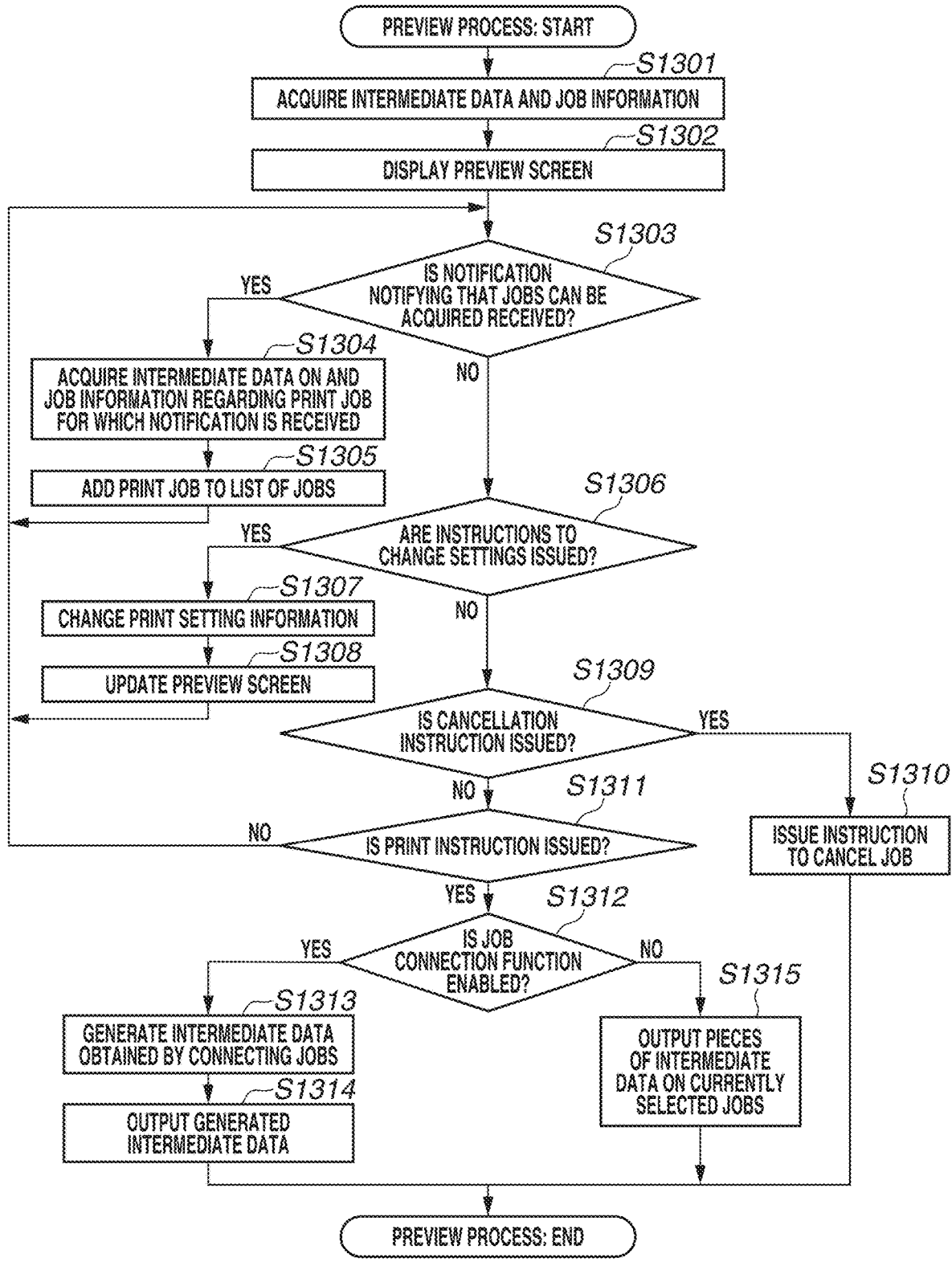
FIG. 13 is a flowchart illustrating a preview process according to the second exemplary embodiment.

FIG. 13 illustrates a flowchart executed by the extension application 203. The processing procedure of the flowchart is performed by the extension application 203 in a case where the UI is newly started in the UI start process.

First, in step S1301, the extension application 203 acquires intermediate data and job information regarding the print job served as the trigger for the start of the processing. Next, in step S1302, based on the intermediate data acquired in step S1301, the extension application 203 displays the print preview screen. In this processing, a single print job is displayed in the print job list on the print preview screen. While, in the first exemplary embodiment, the extension application 203 performs processing according to a user instruction after the print preview screen is displayed, in the second exemplary embodiment, the extension application 203 performs processing also in response to a notification from the OS notifying that jobs can be acquired, in addition to a user instruction. The notification notifying that jobs can be acquired is issued by the OS in step S1205.

In response to receipt of the notification notifying that jobs can be acquired in step S1303 (YES in step S1303), then in step S1304, the extension application 203 acquires intermediate data and job information regarding a print job for which the notification is received. Specifically, in a case where the extension application 203 executes processing based on the notification notifying that jobs can be acquired, the OS passes, to the extension application 203, intermediate data and job information regarding a print job served as a trigger for the issuance of the notification notifying that jobs can be acquired.

In step S1305, the extension application 203 adds the print job acquired in step S1304 to the print job list. In a case where the extension application 203 receives a different notification, indicating that jobs can be acquired, issued using another print job served as a trigger, the extension application 203 repeats steps S1303 to S1305 and adds the print job to the print job list. Consequently, it is possible to handle any number of print jobs on the print preview screen. The processes of steps S1306 to S1315 are similar to those of steps S905 to S914 in the first exemplary embodiment, and thus the redundant descriptions are omitted. The extension application 203 receives a print instruction from the user, generates intermediate data obtained by connecting the pieces of intermediate data on the plurality of print jobs in the print job list, and outputs the intermediate data to the print data generation software 202.

By the above processing, in the present exemplary embodiment, steps S1303 to S1305 are executed, whereby it is possible to add a print job to the display item 401 in the state where the display of the preview screen is maintained (while the preview screen is displayed).

Other Exemplary Embodiments

The present invention can also be achieved by performing the following process. This is the process of supplying software (a program) for achieving the functions of the above exemplary embodiments to a system or an apparatus via a network or various recording media, and of causing a computer (a CPU or a microprocessor unit (MPU)) of the system or the apparatus to read and execute the program. The program may be executed by a single computer, or may be executed by the cooperation of a plurality of computers. Not all the above processing needs to be achieved by software, and part or all of the processing may be achieved by hardware such as an application-specific integrated circuit (ASIC).

The CPU may be not only a single CPU that performs all of the processing, but also a plurality of CPUs that appropriately cooperates to perform the processing.

The present invention is not limited to the above exemplary embodiments, and can be changed and modified in various ways without departing from the spirit and the scope of the present invention. Thus, the following claims are appended to publicize the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus storing print data generation software implemented in an operating system of the information processing apparatus and storing an extension application, the information processing apparatus comprising:

a controller configured to:
receive first image data and information indicating a printing apparatus selected by a user from the print data generation software;
cause a display to display first identification information corresponding to the first image data and second identification information corresponding to second image data, in a case where the second image data corresponding to the information indicating the printing apparatus has been stored before the extension application has been started in order to receive the first image data; and
cause the information processing apparatus to transmit a connected job based on the first image data corresponding to the displayed first identification information and the second image data corresponding to the displayed second identification information a display control unit configured to display, in a case where a third print job including identification information.

2. The information processing apparatus according to claim 1, wherein the controller is further configured to:
cause the display to display a print setting screen based on capability information received from the printing apparatus.

3. The information processing apparatus according to claim 1, wherein the controller is further configured to:
cause the display to display the first identification information corresponding to the first image data and not to display third identification information corresponding to third image data, in a case where the third image data corresponding to information indicating another printing apparatus has been stored before the extension application has been started in order to receive the first image data.

4. The information processing apparatus according to claim 3, wherein the third image data is image data generated with said another printing apparatus specified.

5. A control method for controlling an information processing apparatus storing print data generation software, the control method being performed based on execution of an extension application, the control method comprising:
receiving first image data and information indicating a printing apparatus selected by a user from the print data generation software;
causing a display to display first identification information corresponding to the first image data and second identification information corresponding to second image data, in a case where the second image data corresponding to the information indicating the printing apparatus has been stored before the extension application has been started in order to receive the first image data; and
causing the information processing apparatus to transmit a connected job based on the first image data corresponding to the displayed first identification information and the second image data corresponding to the displayed second identification information.

6. The control method according to claim 5, further comprising:
causing the display to display a print setting screen based on capability information received from the printing apparatus.

7. The control method according to claim 5, further comprising:
causing the display to display the first identification information corresponding to the first image data and not to display third identification information corresponding to third image data, in a case where the third image data corresponding to information indicating another printing apparatus has been stored before the extension application has been started in order to receive the first image data.

8. The control method according to claim 7, wherein the third image data is image data generated with said another printing apparatus specified.

9. The control method according to claim 5, further comprising:
causing the display to display a preview image of the connected job.

10. The control method according to claim 5, wherein the connected job including connected image data is generated based on the first image data and the second image data.

11. A non-transitory computer-readable storage medium storing an extension application for causing an information processing apparatus storing print data generation software to execute perform a control method comprising:
receiving first image data and information indicating a printing apparatus selected by a user from the print data generation software;
causing a display to display first identification information corresponding to the first image data and second identification information corresponding to second image data, in a case where the second image data corresponding to the information indicating the printing apparatus has been stored before the extension application has been started in order to receive the first image data; and
causing the information processing apparatus to transmit a connected job based on the first image data corresponding to the displayed first identification information and the second image data corresponding to the displayed second identification information.

12. The non-transitory computer-readable storage medium storing the extension application according to claim 11, further causing the display to display a print setting screen based on capability information received from the printing apparatus.

13. The non-transitory computer-readable storage medium storing the extension application according to claim 11, further causing the display to display the first identification information corresponding to the first image data and not to display third identification information corresponding to third image data, in a case where the third image data corresponding to information indicating another printing apparatus has been stored before the extension application has been started in order to receive the first image data.

14. The non-transitory computer-readable storage medium storing the extension application according to claim 13, wherein the third image data is image data generated with said another printing apparatus specified.

* * * * *